United States Patent
Joshi et al.

(10) Patent No.: US 10,958,576 B2
(45) Date of Patent: Mar. 23, 2021

(54) SYSTEMS AND METHODS FOR DATA PROCESSING AND STORAGE IN VEHICLES HAVING A ZONE-BASED, CENTRAL COMPUTING IN-VEHICLE COMMUNICATIONS NETWORK ARCHITECTURE

(71) Applicant: GM GLOBAL TECHNOLOGY OPERATIONS LLC, Detroit, MI (US)

(72) Inventors: Prachi Joshi, Troy, MI (US); Prathap Venugopal, Troy, MI (US); Thomas E. Fuhrman, Shelby Township, MI (US); Soheil Samii, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 16/275,389

(22) Filed: Feb. 14, 2019

(65) Prior Publication Data
US 2020/0267080 A1 Aug. 20, 2020

(51) Int. Cl.
*H04J 3/22* (2006.01)
*H04L 12/741* (2013.01)
(Continued)

(52) U.S. Cl.
CPC .......... *H04L 45/745* (2013.01); *H04L 49/901* (2013.01); *H04L 67/12* (2013.01)

(58) Field of Classification Search
USPC ....... 370/229, 230, 328, 338, 351, 352, 355, 370/357, 360, 362, 363, 368, 381, 382,
(Continued)

(56) References Cited

U.S. PATENT DOCUMENTS

| | | | |
|---|---|---|---|
| 2014/0133350 A1* | 5/2014 | Triess | G06F 13/385 370/254 |
| 2015/0333899 A1* | 11/2015 | Nobauer | H04L 12/40091 370/503 |

(Continued)

OTHER PUBLICATIONS

Kim, J.H. et al. Oct. 10, 2015. Gateway Framework for In-Vehicle Networks Based on CAN, FexRay, and Ethernet. vol. 64, No. 10.
(Continued)

*Primary Examiner* — Nguyen H Ngo
(74) *Attorney, Agent, or Firm* — Lorenz & Kopf

(57) ABSTRACT

A system for data processing and storage in vehicles having a zone-based, central computing in-vehicle communications network architecture, includes a zone control unit (ZCU) that receives electronic messages from one or more sensors or electronic control units (ECUs) located within a zone of the vehicle, the ZCU comprising a protocol data unit (PDU) gating module that converts the electronic messages into a plurality of PDUs, and a switch-based Ethernet network that transmits the plurality of PDUs, using Ethernet protocol frames comprising the plurality of PDUs, to a central computing platform. The central computing platform includes an Ethernet handler module that decomposes the Ethernet protocol frames into individual PDUs for storage in a shared memory. The central computing platform further includes a plurality of parsing modules that are configured to access the individual PDUs from the shared memory and perform data processing on the individual PDUs.

19 Claims, 6 Drawing Sheets

(51) Int. Cl.
*H04L 12/879* (2013.01)
*H04L 29/08* (2006.01)

(58) Field of Classification Search
USPC .. 370/386, 389, 395.72, 400, 401, 402, 465, 370/466
See application file for complete search history.

(56) References Cited

U.S. PATENT DOCUMENTS

| | | | |
|---|---|---|---|
| 2016/0114810 A1* | 4/2016 | Luebben | B60W 50/00 701/1 |
| 2018/0374286 A1* | 12/2018 | Kim | H04L 43/50 |
| 2019/0250610 A1* | 8/2019 | Luo | G05D 1/0088 |
| 2019/0283692 A1* | 9/2019 | Kontani | G05D 1/0242 |
| 2019/0296937 A1* | 9/2019 | Kern | H04L 12/40039 |

OTHER PUBLICATIONS

Dipl.-Ing. (FH) mario Maul et al. Jan. 2018. Service-oriented EE zone architecture key elements for new market segements. ATZelektronik Worldwide. pp. 36-41.
Mash, Christopher. Feb. 1, 2018. How Ethernet Will Change Automotive Networks. SemiconductiorEngineering.
Yang, Shuhui et al. Apr. 10-15, 2011. Routing Schemes for Switch-based In-Vehicle Networks.IEEE Conference on Computer Commujnications Workships (Infocom Wkshps).

* cited by examiner

SYSTEMS AND METHODS FOR DATA PROCESSING AND STORAGE IN VEHICLES HAVING A ZONE-BASED, CENTRAL COMPUTING IN-VEHICLE COMMUNICATIONS NETWORK ARCHITECTURE

TECHNICAL FIELD

The technical field generally relates to data processing and storage in the context of in-vehicle communications, and more particularly relates to systems and methods for data processing and storage in vehicles having a zone-based, central computing in-vehicle communications network architecture.

A vehicle is inherently a distributed information system, as the operation of a vehicle depends on the collaborations of functional components in different locations in the vehicle. In modern vehicles, digital networking technology has been exploited for in-vehicle communications due to its cost-effectiveness, space efficiency, and flexibility. Digitized control has realized a variety of functions, some of the more basic and universal of which being various vehicle lights, wind-shield wipers, door/window controls, and motor control, among many others.

The rapid development of vehicle capabilities introduces new challenges and demands for automotive network systems. As such, the amount of transmitted information is expected to increase significantly with the deployment of additional electronic and digital components. For example, to implement a vehicle with autonomous driving capabilities and/or as a central component of the Internet-of-Things, as future vehicle missions may require, hundreds or even thousands of individual electronic control units (ECUs) or sensors may be installed, all networked with one another.

Conventional in-vehicle communications network architectures are based on the concept of vehicle system domains, with ECUs/sensors for like-functioning systems being grouped together behind a domain control unit (DCU). This architecture is based on function of the systems within the vehicle, not necessarily location of the systems within the vehicle, and as such the physical wiring behind just one DCU may be located throughout the vehicle, leading to cost inefficiencies.

To combat this issue, especially as greater and greater numbers of ECUs/sensors are required, the concept of a zone-based, central computing in-vehicle communications network architecture has been proposed. The zone-based architecture employs a number of universal, configurable zone control units (ZCUs) at various locations within the vehicle. Each ZCU is placed in front of a number of ECUs/sensors that are physically located within that "zone" of the vehicle, without regard to commonality of system function. In this manner, the physical wiring requirements are significantly reduced.

Of course, it should be appreciated that domain-based architectures and zone-based architectures have different data processing and storage requirements. As such, a particular challenge has arisen when an in-vehicle communications network is designed based on the zoned-based architecture, yet, due to various design, cost, and availability considerations, still continues to use one or more "legacy" systems that were designed for the older network architecture. In such instances, the zoned-based in-vehicle communications network may not be able to process or store data originating from the legacy systems.

Accordingly, it is desirable to provide systems and methods for data processing and storage in vehicles having a zone-based, central computing in-vehicle communications network architecture, but which is also required to communicate with one or more legacy systems. Furthermore, other desirable features and characteristics of the present invention will become apparent from the subsequent detailed description and the appended claims, taken in conjunction with the accompanying drawings and the foregoing technical field and background.

SUMMARY

Systems and methods for data processing and storage in vehicles having a zone-based, central computing in-vehicle communications network architecture are provided. In one embodiment, a system for data processing and storage in vehicles having a zone-based, central computing in-vehicle communications network architecture, includes a zone control unit (ZCU) that receives electronic messages from one or more sensors or electronic control units (ECUs) located within a zone of the vehicle, the ZCU comprising a protocol data unit (PDU) gating module that converts the electronic messages into a plurality of PDUs, and a switch-based Ethernet network that transmits the plurality of PDUs, using Ethernet protocol frames comprising the plurality of PDUs, to a central computing platform. The central computing platform includes an Ethernet handler module that decomposes the Ethernet protocol frames into individual PDUs for storage in a shared memory. The central computing platform further includes a plurality of parsing modules that are configured to access the individual PDUs from the shared memory and perform data processing on the individual PDUs.

In variations of this embodiment, the ZCU further receives additional Ethernet protocol frames including a further plurality of PDUs from the switch-based Ethernet network and converts the further plurality of PDUs into electronic messages configured for sending to the one or more ECUs or sensors. The switch-based Ethernet network further receives the additional Ethernet protocol frames from the central computing platform. The Ethernet handler module is further configured to compose the further plurality of PDUs into the additional Ethernet protocol frames. Further, the plurality of parsing modules are configured to generate the further plurality of PDUs.

In other variations of this embodiment, the electronic messages are formatted in one or more of controller area network (CAN), local interconnect network (LIN), and FlexRay. The Ethernet handler module includes a look-up table for decomposing Ethernet protocol frames based on FlexRay-originated PDUs into the individual PDUs for storage in the shared memory. The central computing platform includes one or more of: an additional shared memory and an additional processing means, wherein the additional shared memory is accessible by the plurality of parsing modules and/or the additional processing means. Still further, the Ethernet handler module receives the Ethernet protocol frames including the plurality of PDUs and provides the individual PDUs for storage in the shared memory on the basis of a blocking read and wait time schedule and/or a fixed cycle schedule. The Ethernet handler module further includes a buffer.

In another embodiment, a method for data processing and storage in vehicles having a zone-based, central computing in-vehicle communications network architecture, the method including at a ZCU, receiving electronic messages from one or more sensors or ECUs located within a zone of the vehicle, at a PDU gating module of the ZCU, converting the electronic messages into a plurality of PDUs; using a switch-based Ethernet network, transmits the plurality of PDUs, using Ethernet protocol frames comprising the plurality of PDUs, to a central computing platform; at an Ethernet handler module of the central computing platform, decomposing the Ethernet protocol frames into individual PDUs for storage in a shared memory; and at a plurality of parsing modules the central computing platform, accessing the individual PDUs from the shared memory and performing data processing on the individual PDUs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
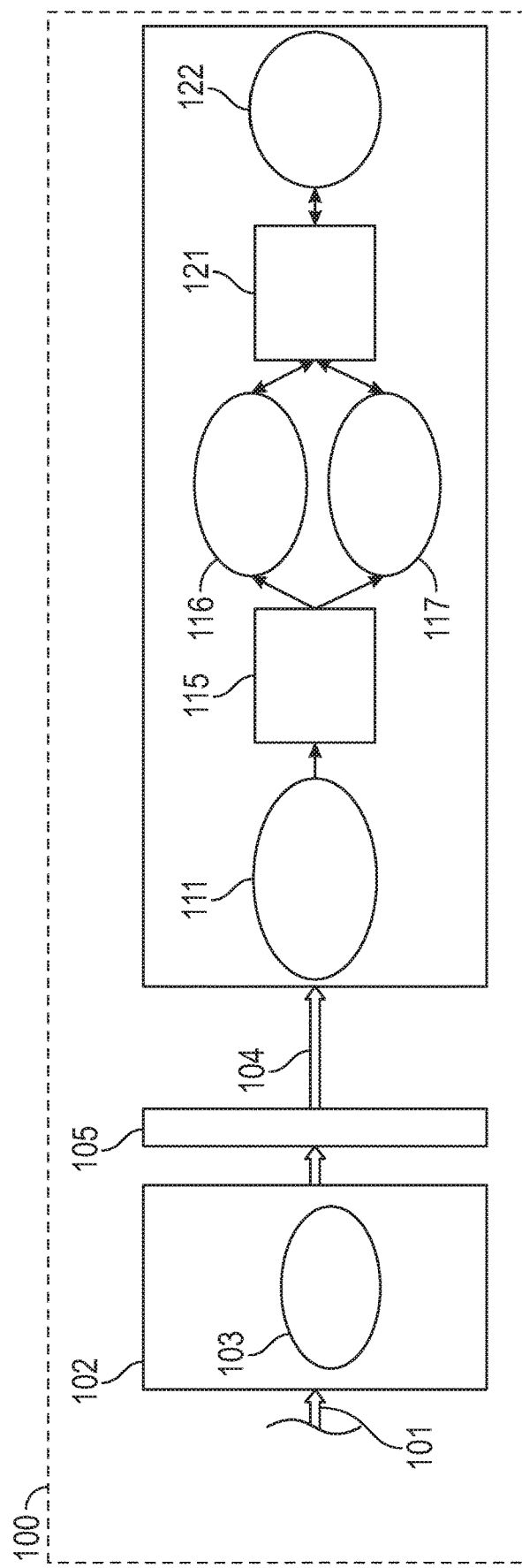
FIG. 1 is a block diagram illustrating an exemplary data flow architecture in accordance with various embodiments.

With reference to FIG. 1, disposed within a vehicle 100 are various interconnected (electronically and/or communicatively) modules that form an exemplary data flow architecture in accordance with various embodiments. The architecture includes one or more zone control units (ZCUs) 102. As previously mentioned, each ZCU 102 is placed in front of a number of ECUs/sensors that are physically located within a respective "zone" of the vehicle 100, without regard to commonality of system function. For simplicity of illustration, arrow 101 is used to generally refer to the message(s) coming from the various ECUs/sensors of the zone to the ZCU 102 (or the reverse path), and illustration of the individual ECUs/sensors is omitted.

Regarding the messages 101, it should be appreciated that the present disclosure is configured to process and store data that originates from the ECUs/sensors in any of the typical data formats for in-vehicle networks, such as Controller Area Network (CAN), Local Interconnect Network (LIN), and FlexRay, which will be briefly reviewed herein. CAN is an automotive-specific bus standard. CAN is typically used to transmit control traffic between ECUs/sensors within the vehicle. It generally allows for a maximum bus speed of 1 Mb/s at lengths of up to 40 m. Messages are encapsulated in frames with a maximum data field size of 64 bits. It does not use a time division multiplexed access (TDMA)-based media access control layer. LIN is an inexpensive broadcast master-slave serial communication bus developed by a consortium consisting of a number of automotive manufacturers. It arose from a desire for a cheaper alternative to CAN for less-important elements of the in-vehicle network. FlexRay, like CAN, is an automotive-specific standard. The main advantages of FlexRay over CAN are its flexibility, higher maximum data rate (10 Mb/s), and its deterministic time-triggered TDMA behavior. Again, messages 101 may include any combination of CAN, LIN, or FlexRay format messages, and may be received into ZCU 102 as such.

Each ZCU 102 is configured to import and digitize data received from the various ECUs/sensors within its zone, and then send the data on for central processing with minimum loss of information. Each ZCU 102 is configured to receive data from multiple different types of ECU/sensor (without regard to system commonality), and in multiple different data formats, as discussed above. Each ZCU 102 is further configured to convert the message 101 data into Ethernet packet format for purposes of sending the data on for central processing. Moreover, each ZCU 102 is configured to operate in the reverse manner, wherein service requests from central processing are converted into the appropriate format and sent back to the respective ECU(s)/sensor(s) for execution.

In accordance with the foregoing functionalities, each ZCU 102 is provided with a protocol data unit (PDU) gating module 103. A protocol data unit (PDU) is a single unit of information transmitted among peer entities of a computer network. A PDU is composed of protocol-specific control information and user data. A PDU is protocol-independent, meaning that it can include data originating from any particular data format/protocol and/or destined for any particular data format/protocol (CAN, LIN, FlexRay). Accordingly, it is the function of the PDU gating module 103 within each ZCU 102 to generate appropriate PDUs from a received ECU/sensor message (of any format/protocol) and/or to generate appropriate messages for sending to an ECU/sensor from received PDUs.

Communication between each ZCU 102 and a central computing platform 110 may be accomplished using a switch-based Ethernet network that includes one or more Ethernet transmission lines 104 and one or more Ethernet switches 105. Using an Ethernet network, the PDUs are carried in Ethernet frames. In the switch-based Ethernet network, routing is realized by using routing tables embedded in switches 105. That is, each switch 105 has a routing table. A routing table has a number of entries. Each entry identifies a message and indicates a related output port. When a message arrives, the routing table is looked up in order to locate the entry that identifies the message. The message is then delivered to the output port indicated in the entry for transmission.

Figure 5:
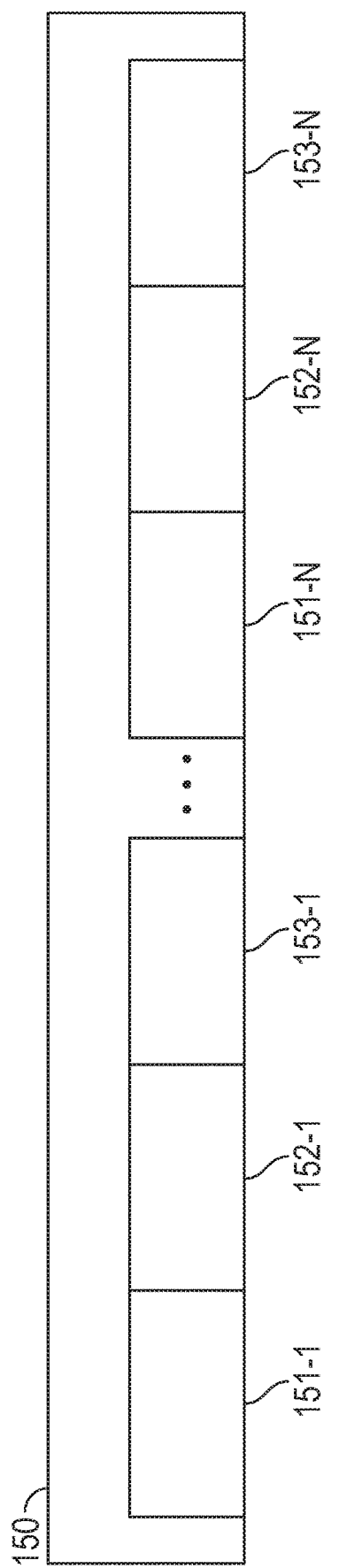
FIG. 5 illustrates the format of any exemplary Ethernet frame in accordance with various embodiments.

In view of the foregoing, greater detail is now provided with regard to the format of Ethernet frames 150 in accordance with the present disclosure, as illustrated in FIG. 5. In general, each Ethernet frame 150 is a combination of a PDU ID (151-1 . . . 151-N), which occupies four bytes, a PDU length (152-1 . . . 152-N), which also occupies four bytes, and the "payload" (153-1 . . . 153-N). For FlexRay-based frames, the PDU ID (151-1 . . . 151-N) is a combination of a Zone ID (i.e., which "zone" of the network architecture the data belongs to), FlexRay Slot Identifier, and a base and running counter of the number of I-PDUs. In contrast, for CAN-based frames, the PDU ID (151-1 . . . 151-N) is a combination of a Zone ID, network ID, and CAN ID. For example, a FlexRay-based PDU ID could be formatted as follows: 0x01020005, representing Zone ID 01, Slot Identifier 02, cycle base 00, and frame 05.

Referring now to the central computing platform 110, Ethernet frames containing PDUs are communicated to and from the platform using the aforementioned switch-based Ethernet network. The central computing platform 110 provides the data processing and storage functionality for the zone-based, central computing in-vehicle communications network architecture of the present disclosure. The central computing platform 110 includes various modules that perform various functions, as will be discussed in greater detail below.

Figure 2:
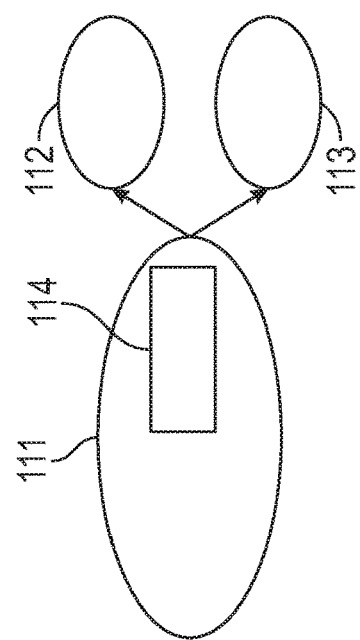
FIG. 2 is a diagram of an Ethernet handler module in accordance with various embodiments.

Regarding Ethernet handler module 111 of central computing platform 110, attention is further directed to FIG. 2, which provides a more detailed view of the Ethernet handler module 111. A particular function of the Ethernet handler module 111 is to provide for the scheduling of the transmission of the various Ethernet frames, whether originating from the central computing platform 110 or being received into the central computing platform. As such, the Ethernet handler module may have a buffer 114 and a plurality of transmission threads 112, 113, which transmit Ethernet frames on different time schedules. For example, thread 112 may utilize a blocking read and wait time schedule, whereas thread 113 may utilize a fixed cycle schedule. The schedules of the transmission threads 112, 113 may be adapted to handle Ethernet frames traveling in either direction to/from the central computing platform 110.

Figure 3A:
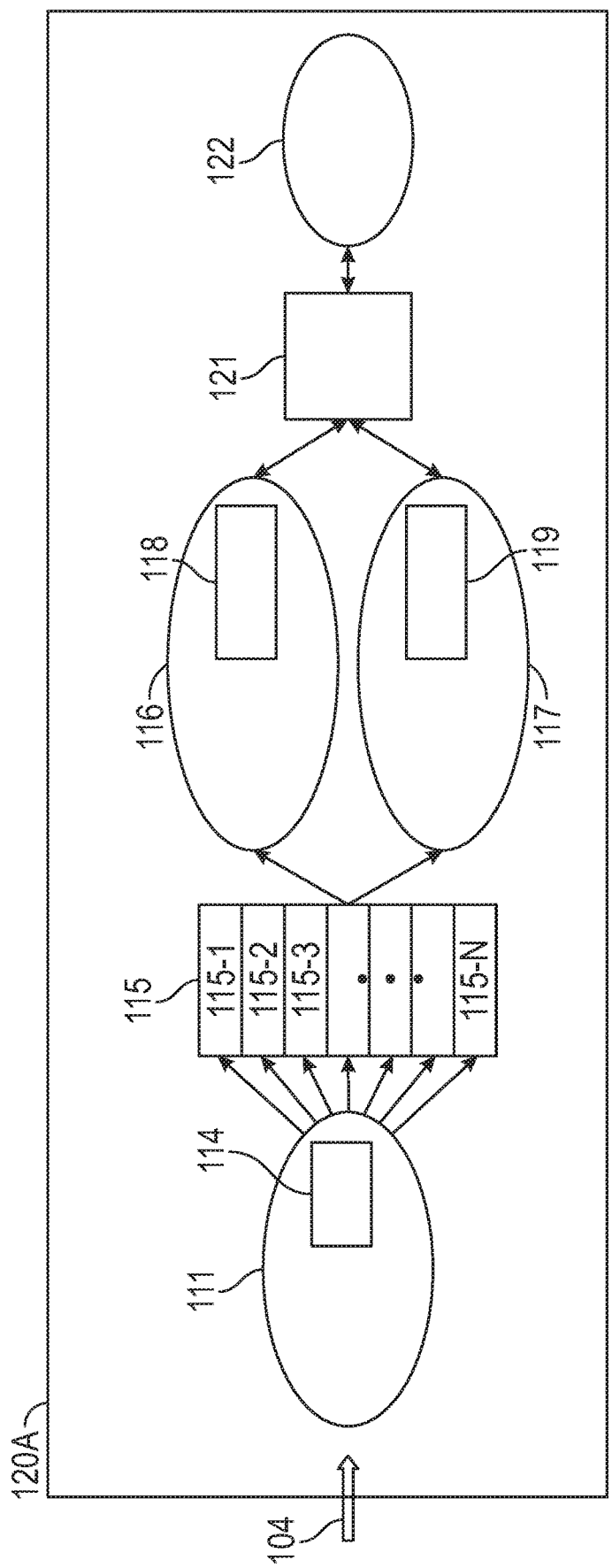
FIGS. 3A and 3B respectively show an Ethernet receive pathway and an Ethernet transmission pathway utilized in connection with a central computing platform in accordance with various embodiments.
Figure 3B:
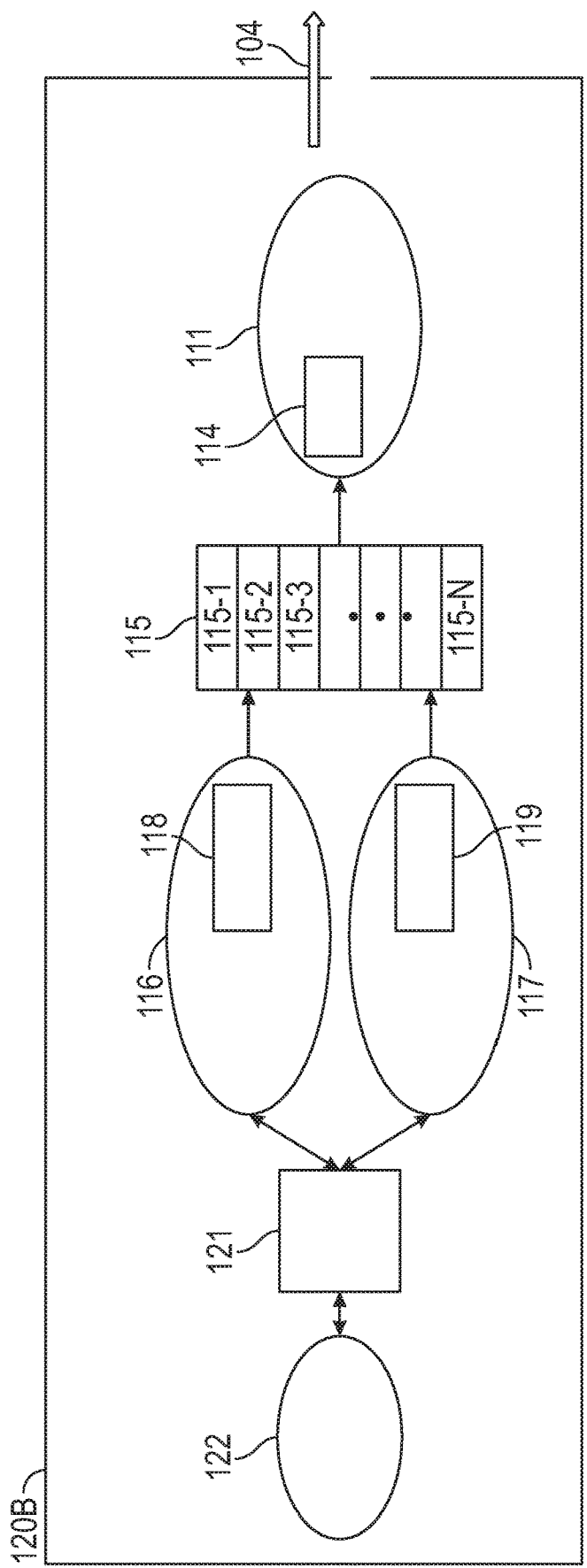
Figure 4A:
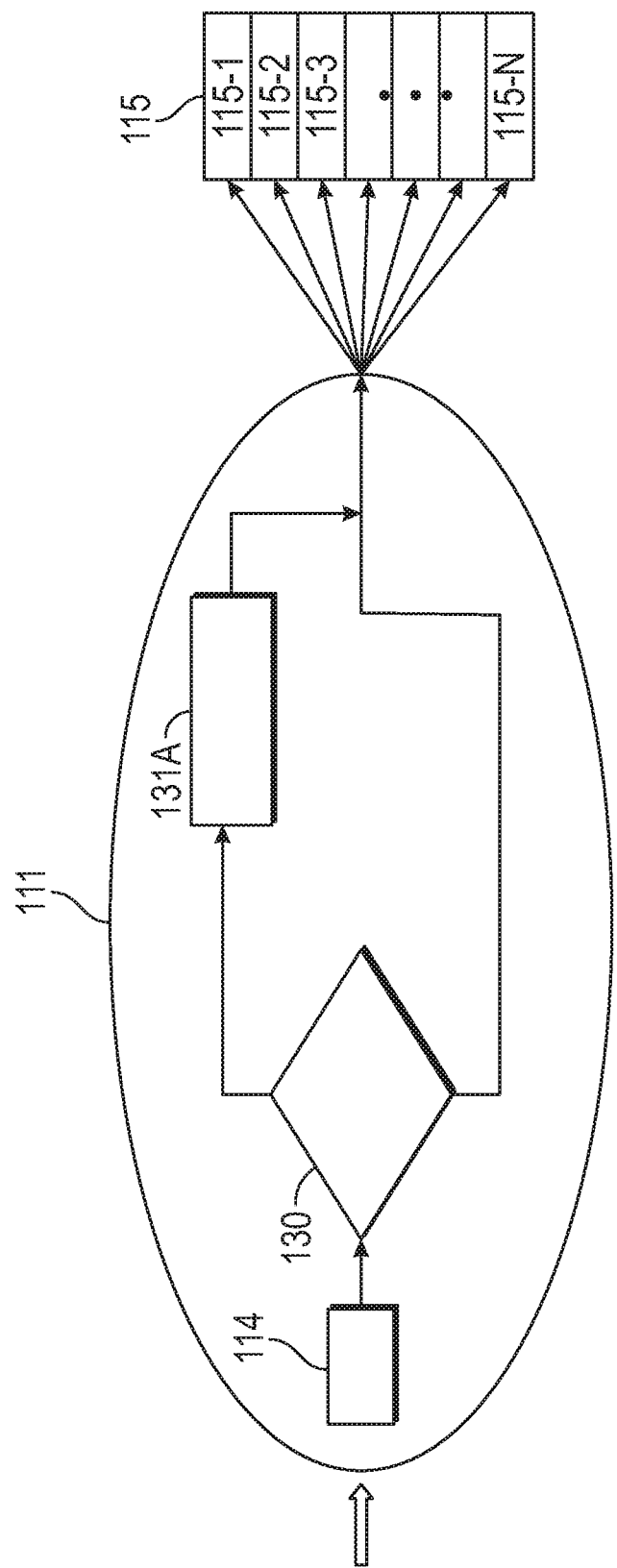
FIG. 4A provides a view of the Ethernet handler module illustrating its method for decomposing Ethernet frames into I-PDUs.

Additional reference is now made to FIGS. 3A and 3B, which respectively show an Ethernet receive pathway 120A and an Ethernet transmission pathway 120B, utilized in connection with the central computing platform 110 shown in FIG. 1. With regard to Ethernet receive pathway 120A, from the Ethernet handler module 111, the received Ethernet frames are broken-down into individual I-PDUs (e.g., I-PDUs 115-1, 115-2, 115-3, . . . 115-N) and stored into first shared memory 115. With regard to the generation of the individual I-PDUs (115-1 through 115-2), further reference is now made to FIG. 4A, which provides a view of the Ethernet handler module 111 illustrating its method for decomposing Ethernet frames into I-PDUs. A shown in FIG. 4A, from buffer 114, the Ethernet frames pass decision block 130, wherein a determination if the Ethernet frames originate from a CAN or a FlexRay network. By their nature, CAN-based frames are separable into I-PDUs without reference to a look-up table, and thus proceed directly to the first shared memory 115, as illustrated. In contrast, FlexRay-based frames must be decomposed with reference to a look-up table, which is performed at block 131A, whereafter the individual I-PDUs may be stored in first shared memory 115. An exemplary pseudo-code for implementing the steps at blocks 130 and 131A is as follows:

```
For all I-PDUs in Frame
    Do {
            Get the I-PDU ID= PID
            Find the slot, s in shared memory 115,
            such that s~ PID
            Store IPDU in s
        }
```

Figure 4B:
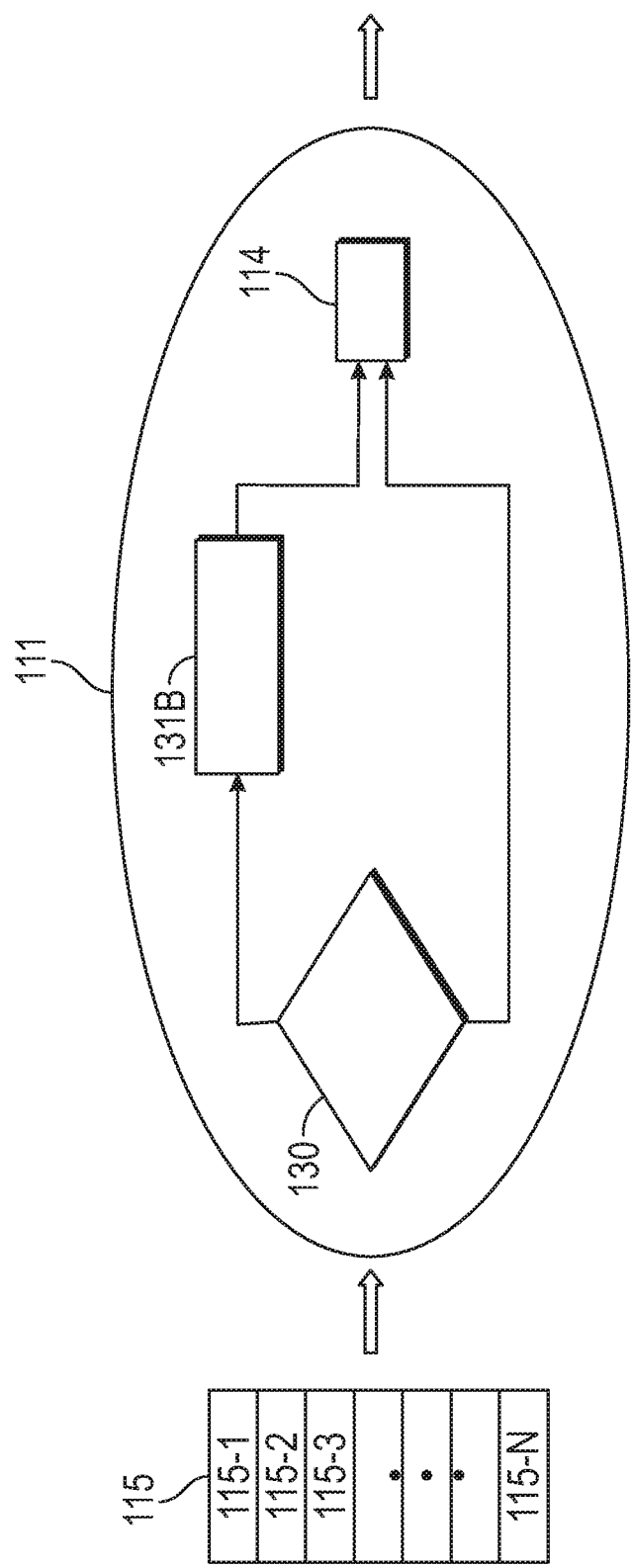
FIG. 4B provides a view of the Ethernet handler module illustrating its method for composing I-PDUs into Ethernet frames.

In contrast, with regard to the Ethernet transmission pathway 120B of FIG. 3B, it should be appreciated that the opposite function occurs, that is, from first shared memory 115, the individual I-PDUs are composed into an appropriate Ethernet frame. Thus, with further reference now to FIG. 4B, which provides a view of the Ethernet handler module 111 illustrating its method for composing I-PDUs into Ethernet frames, again, at decision block 130, a determination is made if the Ethernet frames are destined for a CAN or a FlexRay network. Once the appropriate determination is made, the composition proceeds without reference to a look-up table for CAN messages and with reference to a look-up table, at block 131B for FlexRay PDUs.

With reference now back to FIGS. 2, 3A, and 3B, the central computing platform 110 is able to process data using a plurality of parsing modules 116, 117, each of which performs a particular parsing routine 118, 119, respectively (alternatively referred to as building routines for outbound data from the central computing platform 110). The parsing modules 116, 117 are configured to access the data stored in the first shared memory 115 as well as write data to the first shared memory 115. The parsing modules 116, 117 process data based on the origin and type of data (for example motor controls, wind-shield wipers, various exterior sensors, telematics information, etc.). Thus, the parsing modules 116, 117 only access data from the first shared memory 115 that is relevant to the particular parsing routing 118, 119 that the respective module employs, and this remains true for writing data to the first shared memory 115 as well.

As necessary, additional shared memory (e.g., 121) and an additional data processing means (e.g., 122) may be provided in an embodiment, depending on the particular network architecture employed. This additional shared memory may also be accessed by the parsing modules 116, 117, of course. In any event, and of the parsing modules/processing means may be provided as part of the central computing platform 110 to address data that originates from ECUs/sensors adapted to the zone-based, central-computing architecture, or that may originate from a legacy system. In this manner, the central computing platform 110 is able to process and store data, regardless of its origin, thus yielding a more robust platform useful as vehicle transition from legacy system to the newer zone-based systems.

Furthermore, in general, any of the data processing functionalities of any module of the present disclosure can be any custom made or commercially available processor, a central processing unit (CPU), a graphics processing unit (GPU), an auxiliary processor among several processors, a semiconductor based microprocessor (in the form of a microchip or chip set), a macroprocessor, any combination thereof, or generally any device for executing instructions. Any of the data storage functionalities of any module of the present disclosure may include volatile and nonvolatile storage in read-only memory (ROM), random-access memory (RAM), and keep-alive memory (KAM), for example. They may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for data processing and storage in vehicles having a zone-based, central computing in-vehicle communications network architecture, comprising:
a zone control unit (ZCU) that receives electronic messages from one or more sensors or electronic control units (ECUs) located within a zone of the vehicle, the ZCU comprising a protocol data unit (PDU) gating module that converts the electronic messages into a plurality of PDUs;
a switch-based Ethernet network that transmits the plurality of PDUs, using Ethernet protocol frames comprising the plurality of PDUs, to a central computing platform,
wherein the central computing platform comprises an Ethernet handler module that decomposes the Ethernet protocol frames into individual PDUs for storage in a shared memory, wherein the Ethernet handler module comprises a look-up table for decomposing Ethernet protocol frames based on FlexRay-originated PDUs into the individual PDUs for storage in the shared memory, and wherein the central computing platform further comprises a plurality of parsing modules that are configured to access the individual PDUs from the shared memory and perform data processing on the individual PDUs.

2. The system of claim 1, wherein the ZCU further receives additional Ethernet protocol frames comprising a further plurality of PDUs from the switch-based Ethernet network and converts the further plurality of PDUs into electronic messages configured for sending to the one or more sensors or ECUs.

3. The system of claim 2, wherein the switch-based Ethernet network further receives the additional Ethernet protocol frames from the central computing platform.

4. The system of claim 3, wherein the Ethernet handler module is further configured to compose the further plurality of PDUs into the additional Ethernet protocol frames.

5. The system of claim 4, wherein the plurality of parsing modules are configured to generate the further plurality of PDUs.

6. The system of claim 1, wherein the electronic messages are formatted in one or more of controller area network (CAN), local interconnect network (LIN), and FlexRay.

7. The system of claim 1, wherein the central computing platform comprises one or more of: an additional shared memory and an additional processing means, wherein the additional shared memory is accessible by the plurality of parsing modules and/or the additional processing means.

8. The system of claim 1, wherein the Ethernet handler module receives the Ethernet protocol frames comprising the plurality of PDUs and provides the individual PDUs for storage in the shared memory on the basis of a blocking read and wait time schedule and/or a fixed cycle schedule.

9. The system of claim 8, wherein the Ethernet handler module further comprises a buffer.

10. A vehicle comprising the system of claim 1.

11. A method for data processing and storage in vehicles having a zone-based, central computing in-vehicle communications network architecture, comprising:
at a zone control unit (ZCU), receiving electronic messages from one or more sensors or electronic control units (ECUs) located within a zone of the vehicle,
at a protocol data unit (PDU) gating module of the ZCU, converting the electronic messages into a plurality of PDUs;
using a switch-based Ethernet network, transmits the plurality of PDUs, using Ethernet protocol frames comprising the plurality of PDUs, to a central computing platform;
at an Ethernet handler module of the central computing platform, decomposing the Ethernet protocol frames into individual PDUs for storage in a shared memory, wherein the Ethernet handler module comprises a look-up table for decomposing Ethernet protocol frames based on FlexRay-originated PDUs into the individual PDUs for storage in the shared memory; and
at a plurality of parsing modules the central computing platform, accessing the individual PDUs from the shared memory and performing data processing on the individual PDUs.

12. The method of claim 11, further comprising receiving at the ZCU additional Ethernet protocol frames comprising a further plurality of PDUs from the switch-based Ethernet network and converting the further plurality of PDUs into electronic messages configured for sending to the one or more sensors or ECUs.

13. The method of claim 12, further comprising receiving at the switch-based Ethernet network the additional Ethernet protocol frames from the central computing platform.

14. The method of claim 13, further comprising composing at the Ethernet handler module the further plurality of PDUs into the additional Ethernet protocol frames.

15. The method of claim 14, further comprising generating at the plurality of parsing modules the further plurality of PDUs.

16. The method of claim 11, wherein the electronic messages are formatted in one or more of controller area network (CAN), local interconnect network (LIN), and FlexRay.

17. The method of claim 11, wherein the central computing platform comprises one or more of: an additional shared memory and an additional processing means, wherein the additional shared memory is accessible by the plurality of parsing modules and/or the additional processing means.

18. The method of claim 11, further comprising receiving at the Ethernet handler module the Ethernet protocol frames comprising the plurality of PDUs and providing the individual PDUs for storage in the shared memory on the basis of a blocking read and wait time schedule and/or a fixed cycle schedule.

19. The method of claim 18, wherein the Ethernet handler module further comprises a buffer.

\* \* \* \* \*